(12) United States Patent
Huang

(10) Patent No.: US 11,662,480 B2
(45) Date of Patent: May 30, 2023

(54) IMAGE SENSOR AND ELECTRONIC EQUIPMENT

(71) Applicant: Shanghai Harvest Intelligence Technology Co., Ltd., Shanghai (CN)

(72) Inventor: Jiandong Huang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 0 days.

(21) Appl. No.: 17/354,568

(22) Filed: Jun. 22, 2021

(65) Prior Publication Data

US 2021/0396892 A1 Dec. 23, 2021

(30) Foreign Application Priority Data

Jun. 22, 2020 (CN) .......................... 202021169423.3

(51) Int. Cl.
*G01T 1/20* (2006.01)
(52) U.S. Cl.
CPC .......... *G01T 1/2006* (2013.01); *G01T 1/2002* (2013.01)
(58) Field of Classification Search
CPC ........................... G01T 1/2006; G01T 1/2002
See application file for complete search history.

(56) References Cited

U.S. PATENT DOCUMENTS

| | | | |
|---|---|---|---|
| 7,626,176 B2* | 12/2009 | Zeitler | G01T 1/202 250/370.11 |
| 8,530,989 B2* | 9/2013 | Kikuchi | H01L 27/14623 257/435 |
| 2005/0072931 A1* | 4/2005 | Albagli | G01T 1/2018 250/370.11 |
| 2007/0205354 A1* | 9/2007 | Li | H01L 27/14623 250/214.1 |
| 2008/0258067 A1* | 10/2008 | Vogtmeier | H01L 31/101 250/370.09 |
| 2013/0156157 A1* | 6/2013 | Engel | G21K 1/025 378/62 |

\* cited by examiner

*Primary Examiner* — Hugh Maupin
(74) *Attorney, Agent, or Firm* — Harness, Dickey & Pierce, P.L.C.

(57) ABSTRACT

The present disclosure provides an image sensor and electronic equipment. The image sensor includes: a pixel array, comprising a plurality of pixels, wherein a light-transmitting part is disposed between adjacent pixels; a protective layer, covering at least a part of a surface of the pixel; a conversion layer, configured to convert X-ray into visible light; wherein when X-ray is incident from a side of the image sensor, a portion of the X-ray is incident on the protective layer, another portion of X-ray transmits through the light-transmitting part between the pixels, reaches the conversion layer, and is converted into visible light by the conversion layer and received by the pixel. With the above solution, the pixels can be protected from the damage of X-ray high-energy photons while improving the resolution of the captured X-ray image.

12 Claims, 3 Drawing Sheets

IMAGE SENSOR AND ELECTRONIC EQUIPMENT

CROSS-REFERENCE TO RELATED APPLICATIONS

The present application claims the benefit of priority to Chinese patent application No. 202021169423.3, filed on Jun. 22, 2020, entitled "Image sensor and electronic equipment", the entire disclosures of which are incorporated herein by reference.

TECHNICAL FIELD

The present disclosure relates to the technical field of optical devices, in particular to an image sensor and electronic equipment.

BACKGROUND

X-ray imaging is a radio graphic technique that can be used to reveal the internal structure of non-uniformly composed and opaque objects (such as the human body). X-ray can be applied not only in medical field, but also in other fields where X-ray can be applied for crack detection.

In general image sensors, it is necessary to convert high-energy photons of X-rays into visible light with fluorescent materials, and then use a sensor that can absorb visible light to sample to obtain corresponding electrical signals, and finally form X-ray images.

Typically, fluorescent materials cannot fully absorb the high-energy photons of X-rays, and the remaining high-energy photons will directly act on the sensor, resulting in weak sensor performance.

In order to protect the sensor, the thickness of the fluorescent material will be thick, but thicker fluorescent material will affect the resolution of the captured X-ray image.

SUMMARY

To protect the pixels from the damage of X-ray high-energy photons while improving the resolution of the captured X-ray image, an image sensor is provided according to an embodiment of the present disclosure. The image sensor may include: a pixel array, composed of a number of pixels, wherein a light-transmitting part is arranged between adjacent pixels; a protective layer, covering part of the surface of the pixel; a conversion layer, configured to convert X-rays into visible light; being incident on the protective layer, X-rays pass through the light-transmitting part between the pixels, incident on the conversion layer, wherein X-rays are converted into visible light to be received by the pixels.

In some embodiment, the protective layer only covers the top surface of each pixel in the pixel array; or the protective layer covers the top surface and sidewalls of each pixel in the pixel array.

In some embodiment, the X-ray incident to the conversion layer is converted into visible light and then received by the lower surface of the pixel.

In some embodiment, the protective layer is a material capable of blocking X-rays.

In some embodiment, the conversion layer is located on a side of the protective layer and the pixel array away from the X-ray incident direction.

In some embodiment, it further includes: a substrate, which is located on the protective layer and is suitable for receiving X-rays.

In some embodiment, the material of the conversion layer is a fluorescent material.

In some embodiment, the material of the substrate is a material capable of transmitting X-rays.

In some embodiment, the material of the substrate is glass or soft material.

In some embodiment, the image sensor further includes: a reflective layer located under the conversion layer.

An electronic equipment including the above mentioned image sensor is provided according to another embodiment of the present disclosure.

Compared with conventional technologies, embodiments of the present disclosure have the following beneficial effects.

With above solution of the present disclosure, by providing a protective layer in the image sensor, when X-ray is incident on the substrate, on one hand the protective layer covers the surface of the pixels facing the X-ray incident direction, the pixels can be protected to reduce X-ray damage to the pixel, there is no need to form a thickened conversion layer on the pixels to protect the pixels; on the other hand, the photosensitive side of the pixel array is disposed opposite to the incident direction of X-ray, and the conversion layer is close to the photosensitive side of the pixel array. Thus, the pixels at a location that the side of the conversion layer close to the photosensitive side of the pixel array senses the maximum intensity of visible light, thereby increasing the visible light absorption rate, and forming the X-ray image with higher resolution.

DETAILED DESCRIPTION

Figure 1:
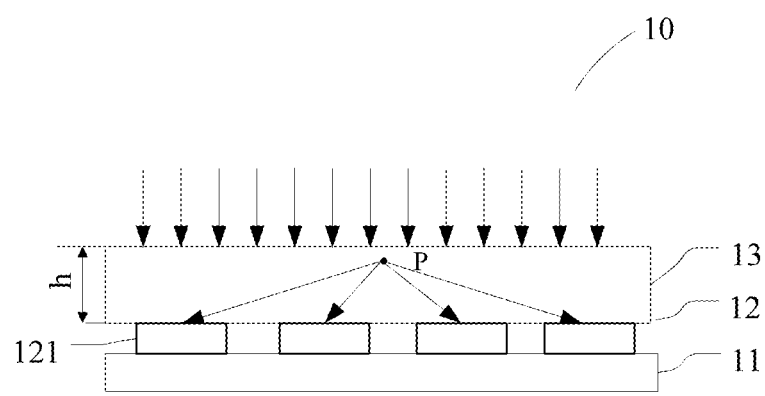
FIG. 1 schematically illustrates a structural diagram of an image sensor in the conventional technologies.

FIG. 1 is a schematic diagram of the structure of an image sensor in the conventional technologies. As shown in FIG. 1, the image sensor 10 may include: a substrate 11, a pixel array 12 on the substrate 11, and a fluorescent layer 13 on the pixel array 12. A plurality of pixels 121 are distributed in the pixel array 12.

When X-rays are incident on the fluorescent layer 13, they are converted into visible light by the fluorescent layer 13, and the visible light is absorbed by the pixels 121 in the pixel array 12 and converted into corresponding electrical signals. An X-ray image can be obtained based on the electrical signal.

However, the fluorescent layer 13 cannot completely absorb the high-energy photons of the X-rays, and the remaining high-energy photons will directly act on the pixels 121, causing the performance of the pixels 121 to deteriorate.

In order to minimize the X-ray damage to the pixel 121, the thickness of the fluorescent layer 13 will be very thick, and the thicker fluorescent layer 13 will affect the resolution of the obtained X-ray image.

Specifically, take a point P in the fluorescent layer 13 as an example. In practice, the thickness of the fluorescent layer 13 is much greater than zero. Due to the effect of the remaining high-energy photons, the light at the point P will be diffused, and the light at the point P may be absorbed by a plurality of pixels 121, causing confusion in the reading position of light signal, thereby affecting the accuracy of light signal reading at the P point, and ultimately resulting in a lower resolution of the X-ray image.

To solve the above problems, the embodiments of the present disclosure provide an imaging module, the imaging module is provided with a protective layer, because the protective layer covers the pixels, the protective layer can protect the pixels, reduce the X-ray damage to the pixel, so there is no need to thicken the fluorescent layer to reduce the X-ray damage to the pixel, and naturally it will not affect the resolution of the X-ray image.

In order to make above objects, features and beneficial effects of the present disclosure more obvious and understandable, specific embodiments of the present disclosure are described in detail in combination with the drawings.

Figure 2:
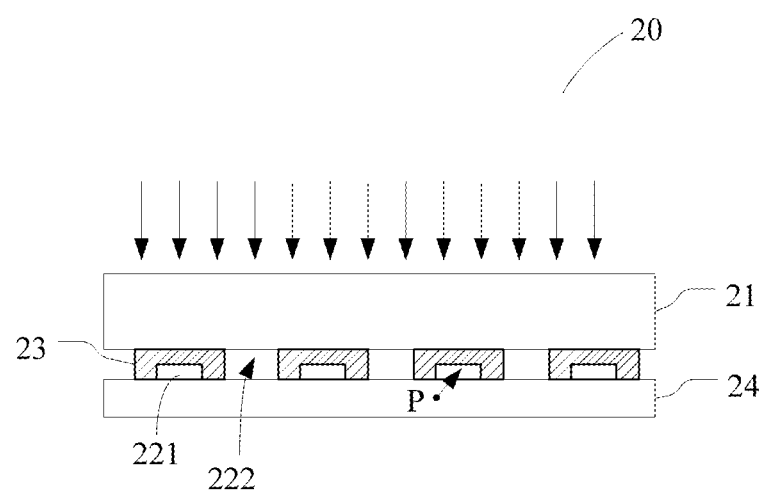
FIG. 2 schematically illustrates a structural diagram of an image sensor according to an embodiment of the present disclosure.

Referring to FIG. 2, an embodiment of the present disclosure provides an image sensor 20, and the image sensor 20 may include: a pixel array (not shown), a protective layer 23 and a conversion layer 24. The pixel array includes a plurality of pixels 221.

The pixel array includes a plurality of pixels 221, and a light-transmitting part 222 is provided between adjacent pixels 221.

The protective layer 23 covers at least a part of a surface of the pixel 221.

The conversion layer 24 may be located under the protection layer 23 and the pixel array, and is suitable for converting the X-rays into visible light.

When X-ray is incident from a side of the image sensor, a portion of the X-ray is incident on the protective layer, another portion of X-ray transmits through the light-transmitting part between the pixels, reaches the conversion layer, and is converted into visible light by the conversion layer and received by the pixel. When the X-rays are incident on the conversion layer 24, the X-ray can be converted into visible light at any point P in the conversion layer 24, and received by a surface of the pixel 221 that is not covered by the protective layer 23. Since visible light propagates in all directions, the pixel 221 is close to the conversion layer 24 and can receive visible light within a large spatial angle range.

In specific embodiments, various methods can be used to form the protective layer, and the present disclosure imposes no limitation on this, as long as the protective layer can protect the pixel 221 so as to reduce the damage to the pixel 221 by X-rays.

In some embodiments, the light-transmitting part 222 may be made of a uniform dielectric material (such as $SiO_2$) or plastic that transmits light.

Figure 3:
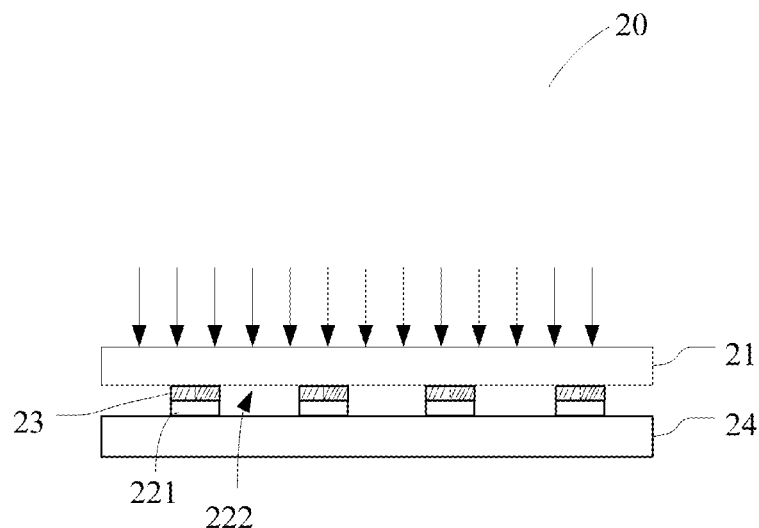
FIG. 3 schematically illustrates a structural diagram of an image sensor according to another embodiment of the present disclosure.

In an embodiment of the present disclosure, as shown in FIG. 2, the protective layer 23 may cover a top surface and sidewalls of each pixel 221 in the pixel array. As shown in FIG. 3, the protective layer 23 may also only cover the top surface of each pixel 221 in the pixel array.

When the protective layer 23 covers the top surface and one or more sidewalls of each pixel 221 in the pixel array, X-rays can be incident on the conversion layer 24 from the light-transmitting part between the protective layer 23 and adjacent pixels, and the X-ray incident to the conversion layer 24 is converted into visible light and then received by a bottom surface of the pixel 221, where the bottom surface of the pixel 221 is opposite to the top surface of the pixel 221.

In a specific embodiment, a variety of materials may be used to form the protective layer 23, as long as the protective layer 23 can block the incidence of X-rays to the pixels 221. In an embodiment of the present disclosure, the protective layer 23 may be made from any material that can block X-rays, such as sputtered lead.

That is to say, in a specific implementation, lead can be disposed on the top surface of the pixel 221, or on the top surface and one or more sidewalls of the pixel 221 at the same time, through a sputtering process.

In an embodiment of the present disclosure, the conversion layer 24 may be located on a side of the protective layer 23 and the pixel array away from the X-ray incident direction.

In an embodiment of the present disclosure, the image sensor 20 may further include a substrate 21, which is located on the protective layer 23 and is configured for receiving and transmitting X-rays.

When X-rays are incident on the substrate 21, they can be irradiated onto the conversion layer 24 through the light-transmitting part 222 between the pixels 221. A size of the light-transmitting part 222 can be set according to factors such as a size of the image sensor, a size of the pixel 221 and the like.

In specific implementation, there are many possibilities for the position of the conversion layer 24, which is not limited in the present disclosure.

In an embodiment of the present disclosure, the conversion layer 24 may be disposed under the protective layer 23 and the pixel array. In another embodiment of the present disclosure, the protective layer 23 and the pixel array may also be disposed within the conversion layer 24 and close to a top surface of the conversion layer 24.

In a specific implementation, the conversion layer 24 may be made of multiple materials, which is not specifically limited, as long as the conversion layer 24 can convert X-rays into visible light that can be received and sensed by pixels.

In an embodiment of the present disclosure, the conversion layer 24 may be made of a fluorescent material. The fluorescent material may be a phosphor, and the phosphor may be doped with sodium iodide, with a thickness of, for example, 1 mm to 2 mm.

Figure 4:
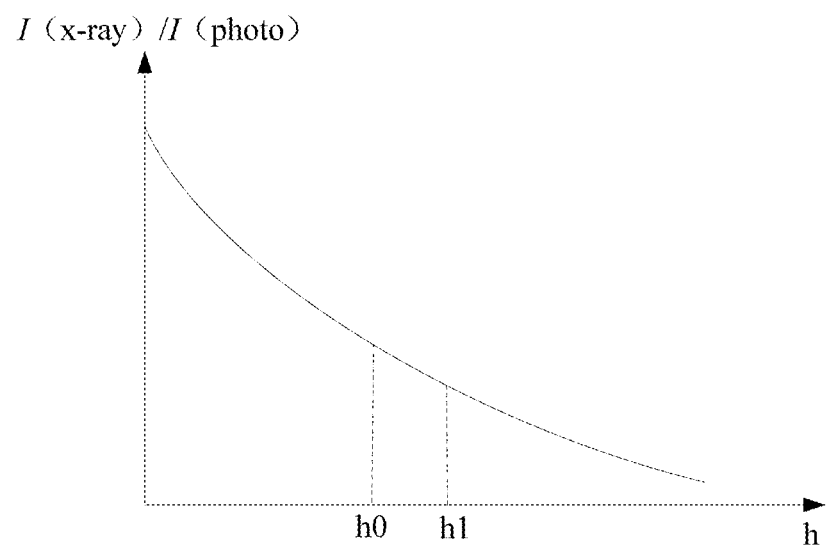
FIG. 4 is a graph showing the change curve of the energy of light absorbed by pixels and the energy of X-rays in the image sensor in FIG. 1 as the thickness of the fluorescent layer increases.

Referring to FIG. 1 and FIG. 4, shown in FIG. 1 using the image sensor 10, X-rays is incident on the fluorescent layer 13. In the incident direction, the X-ray has a highest intensity at an upper surface of the fluorescent layer 13. With reference to FIG. 4, as the X-ray reaches deeper inside the fluorescent layer 13, the energy I (x-ray) of the X-rays will attenuate, and the light finally received by the pixel 121 has a relatively low intensity.

Taking the internal thickness of the fluorescent layer 13 is h as an example, in the incident direction, the thickness from the upper surface of the fluorescent layer 13 to a first position is h0, and the thickness from the upper surface of the fluorescent layer 13 to a second position is h1, h0 is less than h1. The energy of the X-ray at the first position inside the fluorescent layer 13 is greater than the energy of the X-ray at the second position inside the fluorescent layer 13.

As shown in FIG. 4, for the energy I (photo) of the light received by the pixel 121, as the thickness of the fluorescent layer 13 increases, the value of I (photo) will gradually decrease, not the maximum value.

Figure 5:
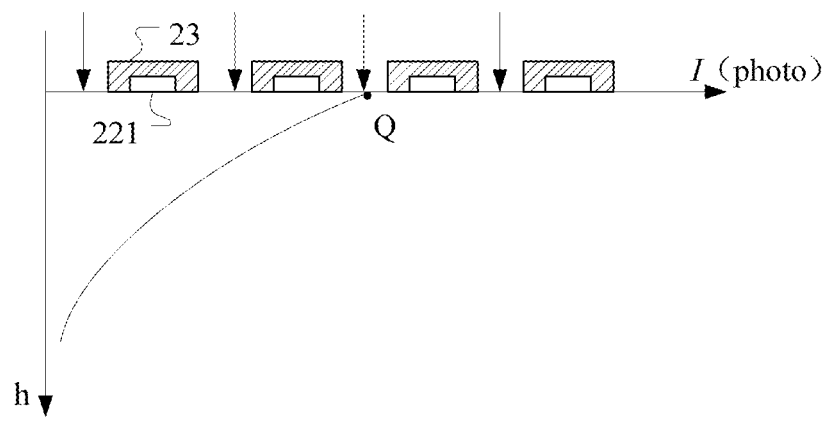
FIG. 5 is a change curve of the energy absorbed by the pixels in the image sensor of the present disclosure as the conversion thickness increases.

With the solution of the present disclosure, referring to FIGS. 2 and 5, since the photosensitive side of the pixel array is arranged opposite to the incident direction of X-rays, and the conversion layer 24 is arranged on a side of the pixel array away from the incident direction of X-rays. Therefore, the visible light has a largest intensity at the position Q close to the pixel 221, so that the light absorbing rate of the pixels is the highest, and the obtained X-ray image has a higher resolution.

In the embodiment of the present disclosure, the substrate 21 is arranged on the protective layer 23 of the image sensor 20 for receiving X-rays. Wherein, the substrate 21 may be a material capable of transmitting X-rays, such as glass.

In an embodiment of the present disclosure, in order to facilitate application and improve user experience, the material of the substrate 21 can also be a soft material, such as a PI (polymide) film, so that the image sensor 20 can be easily bendable, such as the image sensor 20 may be bent into a ring shape or a spherical shape so as to be arranged in a limited space. For example, the image sensor 20 can be used for dental diagnosis, which is convenient to fit the detected part and improve the detection efficiency and accuracy.

Figure 6:
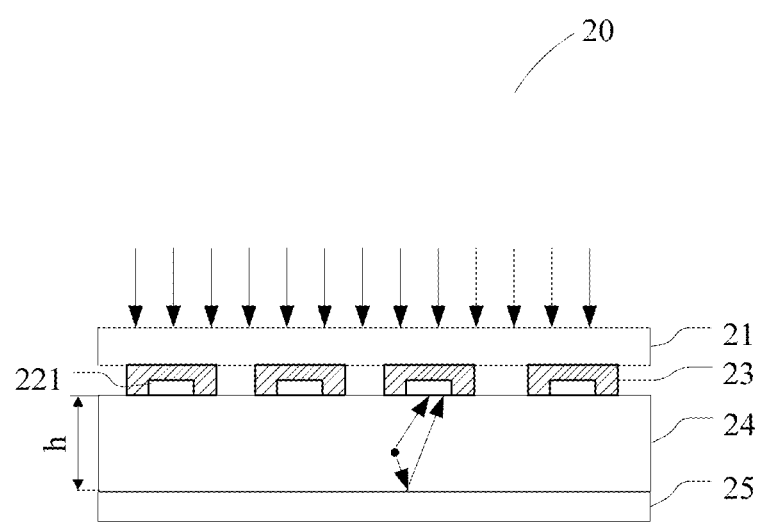
FIG. 6 schematically illustrates a structural diagram of an image sensor in another embodiment of the present disclosure.

In another embodiment of the present disclosure, referring to FIG. 6, the image sensor 20 may further include: a reflective layer 25 located at a side of the conversion layer away from the pixel array.

Referring to FIG. 6, X-rays are incident into the conversion layer 24 through the light-transmitting part between the pixels 221. The conversion layer 24 can convert X-rays into visible light. Most of the visible light is incident on the pixel 221, and the remaining part of the visible light that is not received by the pixel 221 is reflected by the reflective layer 25 to the pixel 221, thereby improving the light absorbing rate of the pixel 221. On the other hand, with the reflective layer 25, the reflection of X-rays can also be enhanced, wherein the portion of X-rays that have not been converted into visible light are reflected into the conversion layer 24 and converted into visible light, thereby increasing the intensity of visible light. Since the thickness of the conversion layer 24 has a certain impact on the resolution of the X-ray image, using the reflective layer 25, the thickness of the conversion layer 24 can be reduced, thereby increasing the intensity of visible light, reducing the intensity of X-rays, improving safety, and reducing damage to the human body.

In some embodiments, the material of the reflective layer 25 may be metal such as aluminum. The reflective layer 25 is formed by plating a metal film on the surface of the conversion layer 24, and the thickness of the reflective layer 25 may be much smaller than that of the conversion layer 24, to further reduce the thickness of the image sensor and realize a lighter and thinner device, which is especially suitable for electronic products such as mobile phones and tablet computers. Specifically, the thickness of the conversion layer 24 may be on the order of millimeters, and the thickness of the reflection layer 25 may be on the order of sub-micrometers.

It can be seen from the above content that the image sensor in the embodiment of the present disclosure is provided with a protective layer to cover the pixels, thereby reducing the X-ray damage to the pixels; and the photosensitive surface of the pixel array faces away from the incidence of X-rays. The conversion layer is set close to the photosensitive surface of the pixel array, so the pixel at a location that the side of the conversion layer close to the photosensitive surface of the pixel array senses the maximum intensity of visible light, thereby increasing light absorbing rate of the visible light, and improving resolution of the obtained X-ray image.

The embodiment of the present disclosure also provides an electronic equipment, wherein the electronic equipment includes any one of the image sensors 20 described above.

In a specific implementation, the electronic equipment may be a medical equipment, or a testing equipment used for radiographic crack detection or the like, or may be a high-speed rail track crack detection equipment, which is not specifically limited.

Although the present disclosure has been disclosed above, the present disclosure is not limited thereto. Any changes and modifications may be made by those skills in the art without departing from the spirit and scope of the present disclosure, and the scope of the present disclosure should be determined by the appended claims.

The invention claimed is:

1. An image sensor, comprising:
   a pixel array, comprising a plurality of pixels, wherein a light-transmitting part is disposed between adjacent pixels;
   a protective layer, covering at least a part of a surface of the pixel and facing an incident direction of an X-ray; and
   a conversion layer, configured to convert the X-ray into visible light;
   wherein when the X-ray is incident from a side of the image sensor, a portion of the X-ray is incident on the protective layer, and another portion of X-ray transmits through a light-transmitting part between the pixels, reaches the conversion layer, and is converted into visible light by the conversion layer and received by the pixel.

2. The image sensor according to claim 1, wherein the protective layer only covers a top surface of each pixel in the pixel array; or the protective layer covers the top surface and sidewalls of each pixel in the pixel array.

3. The image sensor according to claim 2, wherein the X-ray reaching the conversion layer is converted into visible light and received by a bottom surface of the pixel, and the bottom surface is opposite to the top surface of the pixel.

4. The image sensor according to claim 1, wherein the protective layer is made from a material configured to block the X-ray.

5. The image sensor according to claim 1, wherein the conversion layer is disposed on a side of the protective layer and the pixel array away from the incident direction of the X-ray.

6. The image sensor according to claim 1, further comprising: a substrate, wherein the substrate is disposed on the protective layer and configured to receive and transmit the X-ray.

7. The image sensor according to claim 6, wherein the substrate is made from a material configured to transmit the X-ray.

8. The image sensor according to claim 6, wherein the substrate is made from glass or a soft material.

9. The image sensor according to claim 1, wherein the conversion layer is made from a fluorescent material.

10. The image sensor according to claim 1, further comprising: a reflective layer disposed on a side of the conversion layer away from the pixel array.

11. An electronic equipment, comprising the image sensor according to claim 1.

12. The image sensor according to claim 1, wherein a photosensitive side of the pixel array is disposed opposite to the incident direction of the X-ray, and the conversion layer is proximate to the photosensitive side of the pixel array.

* * * * *